US007814420B2

(12) United States Patent
Gerhart et al.

(10) Patent No.: US 7,814,420 B2
(45) Date of Patent: Oct. 12, 2010

(54) SYSTEM AND METHOD FOR PROVIDING CONTEXT SENSITIVE HELP INFORMATION

(75) Inventors: G. Brent Gerhart, Plymouth Meeting, PA (US); Christopher A. Lunemann, Jim Thorpe, PA (US); Mark W. Trush, Elkins Park, PA (US)

(73) Assignee: Honeywell International Inc., Morristown, NJ (US)

( * ) Notice: Subject to any disclaimer, the term of this patent is extended or adjusted under 35 U.S.C. 154(b) by 316 days.

(21) Appl. No.: 11/300,041

(22) Filed: Dec. 14, 2005

(65) Prior Publication Data

US 2007/0136667 A1 Jun. 14, 2007

(51) Int. Cl.
G06F 3/00 (2006.01)
G06F 3/48 (2006.01)
G06F 17/30 (2006.01)

(52) U.S. Cl. ............... 715/705; 715/708; 715/715; 715/721; 715/745; 715/776; 715/809; 715/855; 707/999.001; 707/999.002; 707/999.741

(58) Field of Classification Search .......... 715/705, 715/715, 721, 745, 776, 708, 809, 855; 707/999.102, 707/999.103
See application file for complete search history.

(56) References Cited

U.S. PATENT DOCUMENTS

| 5,535,323 | A | * | 7/1996 | Miller et al. | 715/707 |
| 5,754,176 | A | * | 5/1998 | Crawford | 715/711 |
| 5,845,273 | A | * | 12/1998 | Jindal | 1/1 |
| 5,933,139 | A | * | 8/1999 | Feigner et al. | 715/708 |
| 6,005,569 | A | * | 12/1999 | Breggin | 715/711 |
| 6,016,467 | A | * | 1/2000 | Newsted et al. | 704/9 |
| 6,102,967 | A | * | 8/2000 | Feigner et al. | 717/113 |
| 6,233,290 | B1 | * | 5/2001 | Raphaeli | 375/341 |
| 6,246,404 | B1 | * | 6/2001 | Feigner et al. | 715/708 |
| 6,307,544 | B1 | * | 10/2001 | Harding | 715/709 |
| 6,452,607 | B1 | | 9/2002 | Livingston | |
| 6,587,121 | B1 | * | 7/2003 | Nelson et al. | 715/705 |
| 6,667,747 | B1 | * | 12/2003 | Spellman et al. | 715/714 |
| 7,024,418 | B1 | * | 4/2006 | Childress | 1/1 |
| 7,024,658 | B1 | * | 4/2006 | Cohen et al. | 717/117 |
| 7,194,685 | B2 | * | 3/2007 | Morrison | 715/705 |
| 2002/0054123 | A1 | * | 5/2002 | Walden et al. | 345/781 |
| 2002/0126140 | A1 | | 9/2002 | Gorbet et al. | |
| 2003/0001875 | A1 | * | 1/2003 | Black et al. | 345/708 |

(Continued)

FOREIGN PATENT DOCUMENTS

WO    WO 03/048930 A2    6/2003

*Primary Examiner*—Dennis-Doon Chow
*Assistant Examiner*—Linh K Pham
(74) *Attorney, Agent, or Firm*—Munck Carter, LLP

(57) ABSTRACT

A method includes receiving information identifying a plurality of selections made by a user. The method also includes updating a help index value based on one or more of the selections. The method further includes detecting a request for help from the user. In addition, the method includes retrieving help information using the help index value and presenting the retrieved help information to the user. At least one of the selections by the user may include a selection of an option from a plurality of options, where each of the options is associated with a different incremental value. Updating the help index value may include adding the incremental value associated with the selected option to the help index value.

21 Claims, 5 Drawing Sheets

U.S. PATENT DOCUMENTS

| | | | |
|---|---|---|---|
| 2003/0016238 A1* | 1/2003 | Sullivan et al. | 345/705 |
| 2003/0182292 A1* | 9/2003 | Leong et al. | 707/100 |
| 2004/0088577 A1* | 5/2004 | Render | 713/201 |
| 2005/0182783 A1* | 8/2005 | Vadai et al. | 707/102 |
| 2006/0036991 A1* | 2/2006 | Biazetti et al. | 717/104 |
| 2006/0080607 A1* | 4/2006 | Cohen et al. | 715/705 |
| 2006/0085750 A1* | 4/2006 | Easton et al. | 715/708 |
| 2007/0220429 A1* | 9/2007 | Kureshy et al. | 715/708 |
| 2007/0277104 A1* | 11/2007 | Hennum et al. | 715/705 |

* cited by examiner

| 402 | 404 | 406 | 408 |
|---|---|---|---|
| Product Selection Dialog | Auxiliary Network | Supervisory Network | Supervisory Network | ... |
| 412 <br><br> Values added to MapID ===> | none = 1000 <br> RSLinx = 2000 <br> Ethernet = 3000 <br> Other = 5000 <br> LCN = 6000 | Ethernet = 30k <br> FTE = 40k | Ethernet = 30k <br> FTE = 40k | ... |
| Server (09) <br> ↖ 410 | 9 RSLinx  414↗ <br>   LCN <br>   Other <br>   Ethernet <br>   RSLinx <br>   LCN <br>   Other | FTE (42,009) <br> (46,009) <br> (45,009) <br> ENet (33,009) <br> (32,009) <br> (36,009) <br> (35,009) | | 42,009 <br> 46,009 <br> 45,009 <br> 33,009 <br> 32,009 <br> 36,009 <br> ... |
| Flex Station (10) | | 416↗ | 10 FTE (41,010) <br>    ENet (31,010) | 41,010 <br> 31,010 <br> ... |
| Console Station (11) | 11 LCN <br>    Other <br>    LCN <br>    Ethernet <br>    Other | FTE (46,011) <br> (45,011) <br> ENet (36,011) <br> (33,011) <br> (35,011) | | 46,011 <br> 45,011 <br> 36,011 <br> 33,011 <br> ... |

FIGURE 4

SYSTEM AND METHOD FOR PROVIDING CONTEXT SENSITIVE HELP INFORMATION

TECHNICAL FIELD

This disclosure relates generally to computing systems and more specifically to a system and method for providing context sensitive help information.

BACKGROUND

Processing facilities are often managed using process control systems. Example processing facilities include manufacturing plants, chemical plants, crude oil refineries, and ore processing plants. Among other operations, process control systems typically manage the use of motors, valves, and other industrial equipment in the processing facilities.

In conventional process control systems, the installation of a software program on a system component is often a complex and time-consuming process. This is typically because many different software modules and subsystems need to be installed. Also, installations of the same software program may vary, such as when the software program is installed on different devices or in process control systems having different configurations. Because of this, written documentation associated with the software program (such as an installation manual) is often complex and difficult to use. In addition, the written documentation typically is not linked to a particular installation of the software program or to a particular configuration of the installation. As a result, it is often difficult for a user to obtain specific help information during a particular installation of the software program.

SUMMARY

This disclosure provides a system and method for providing context sensitive help information.

In a first embodiment, a method includes receiving information identifying a plurality of selections made by a user. The method also includes updating a help index value based on one or more of the selections. The method further includes detecting a request for help from the user. In addition, the method includes retrieving help information using the help index value and presenting the retrieved help information to the user.

In particular embodiments, at least one of the selections by the user includes a selection of an option from a plurality of options. Each of the options is associated with a different incremental value. Updating the help index value includes adding the incremental value associated with the selected option to the help index value.

In other particular embodiments, the help information is divided into Hypertext Markup Language (HTML) pages. Each HTML page is associated with a unique map identifier, and the help index value represents one of the map identifiers.

In a second embodiment, an apparatus includes at least one memory capable of storing help information. The apparatus also includes at least one processor capable of receiving information identifying a plurality of selections made by a user. The at least one processor is also capable of updating a help index value based on one or more of the selections. The at least one processor is further capable of detecting a request for help from the user. In addition, the at least one processor is capable of retrieving a portion of the help information using the help index value and presenting the retrieved portion of the help information to the user.

In a third embodiment, a computer program is embodied on a computer readable medium and is operable to be executed by a processor. The computer program includes computer readable program code for receiving information identifying a plurality of selections made by a user. The computer program also includes computer readable program code for updating a help index value based on one or more of the selections and detecting a request for help from the user. In addition, the computer program includes computer readable program code for retrieving help information using the help index value and presenting the retrieved help information to the user.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIG. 4 illustrates an example table representing the use of context sensitive help information according to one embodiment of this disclosure.

DETAILED DESCRIPTION

Figure 1:
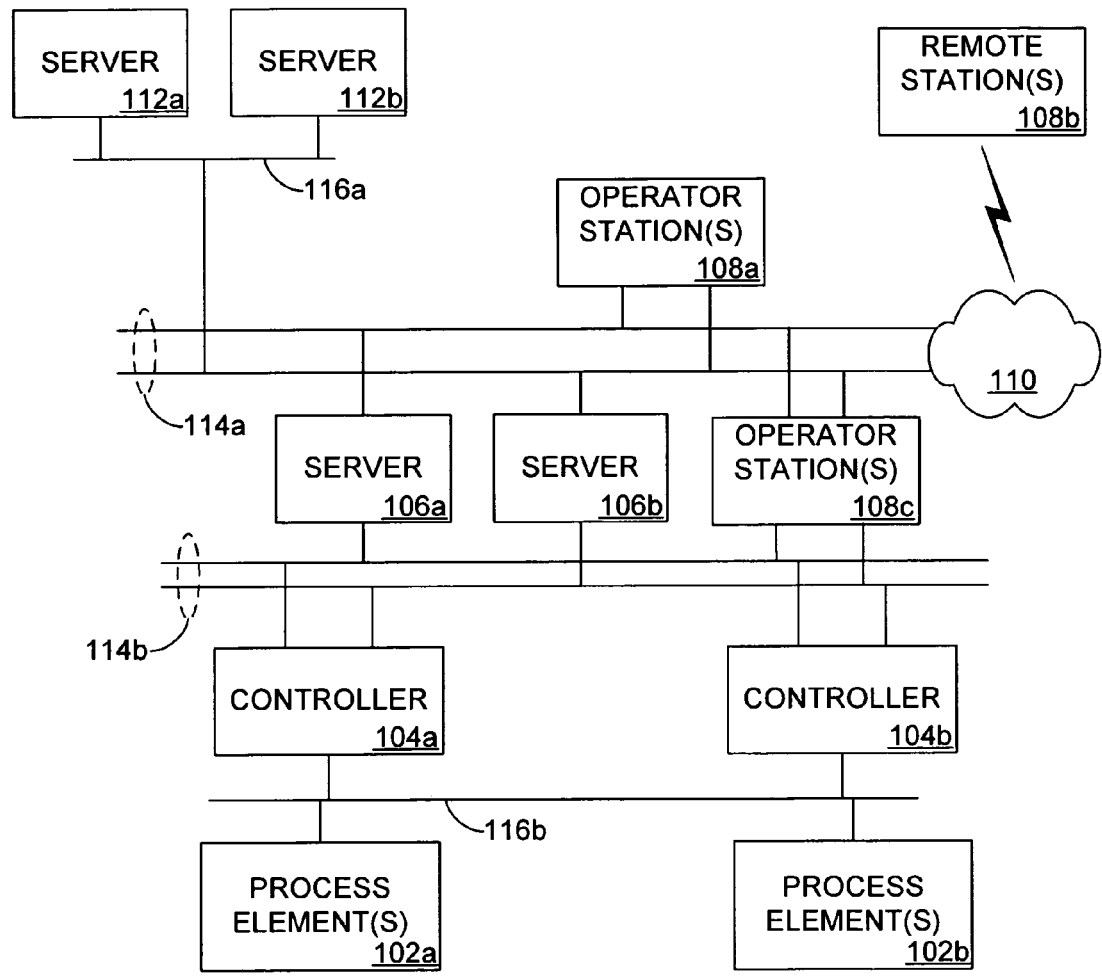
FIG. 1 illustrates an example process control system according to one embodiment of this disclosure.

FIG. 1 illustrates an example process control system 100 according to one embodiment of this disclosure. The embodiment of the process control system 100 shown in FIG. 1 is for illustration only. Other embodiments of the process control system 100 may be used without departing from the scope of this disclosure.

In this example embodiment, the process control system 100 includes one or more process elements 102a-102b. The process elements 102a-102b represent components in a process or production system that may perform any of a wide variety of functions. For example, the process elements 102a-102b could represent motors, catalytic crackers, valves, and other industrial equipment in a production environment. The process elements 102a-102b could represent any other or additional components in any suitable process or production system. Each of the process elements 102a-102b includes any hardware, software, firmware, or combination thereof for performing one or more functions in a process or production system.

Two controllers 104a-104b are coupled to the process elements 102a-102b. The controllers 104a-104b control the operation of the process elements 102a-102b. For example, the controllers 104a-104b could be capable of providing control signals to the process elements 102a-102b periodically. Each of the controllers 104a-104b includes any hardware, software, firmware, or combination thereof for controlling one or more of the process elements 102a-102b. The controllers 104a-104b could, for example, include processors of the POWERPC processor family running the GREEN HILLS INTEGRITY operating system or processors of the X86 processor family running a MICROSOFT WINDOWS operating system.

Two servers 106a-106b are coupled to the controllers 104a-104b. The servers 106a-106b perform various functions to support the operation and control of the controllers 104a-104b and the process elements 102a-102b. For example, the servers 106a-106b could log information collected or generated by the controllers 104a-104b, such as status information related to the operation of the process elements 102a-102b. The servers 106a-106b could also execute applications that control the operation of the controllers 104a-104b, thereby controlling the operation of the process elements 102a-102b. In addition, the servers 106a-106b could provide secure access to the controllers 104a-104b. Each of the servers 106a-106b includes any hardware, software, firmware, or combination thereof for providing access to or control of the controllers 104a-104b. The servers 106a-106b could, for example, represent personal computers (such as desktop computers) executing a MICROSOFT WINDOWS operating system. As another example, the servers 106a-106b could include processors of the POWERPC processor family running the GREEN HILLS INTEGRITY operating system or processors of the X86 processor family running a MICROSOFT WINDOWS operating system.

One or more operator stations 108a-108b are coupled to the servers 106a-106b, and one or more operator stations 108c are coupled to the controllers 104a-104b. The operator stations 108a-108b represent computing or communication devices providing user access to the servers 106a-106b, which could then provide user access to the controllers 104a-104b and the process elements 102a-102b. The operator stations 108c represent computing or communication devices providing user access to the controllers 104a-104b (without using resources of the servers 106a-106b). As particular examples, the operator stations 108a-108c could allow users to review the operational history of the process elements 102a-102b using information collected by the controllers 104a-104b and/or the servers 106a-106b. The operator stations 108a-108c could also allow the users to adjust the operation of the process elements 102a-102b, controllers 104a-104b, or servers 106a-106b. Each of the operator stations 108a-108c includes any hardware, software, firmware, or combination thereof for supporting user access and control of the system 100. The operator stations 108a-108c could, for example, represent personal computers having displays and processors executing a MICROSOFT WINDOWS operating system.

In this example, at least one of the operator stations 108b is remote from the servers 106a-106b. The remote station is coupled to the servers 106a-106b through a network 110. The network 110 facilitates communication between various components in the system 100. For example, the network 110 may communicate Internet Protocol (IP) packets, frame relay frames, Asynchronous Transfer Mode (ATM) cells, or other suitable information between network addresses. The network 110 may include one or more local area networks (LANs), metropolitan area networks (MANs), wide area networks (WANs), all or a portion of a global network such as the Internet, or any other communication system or systems at one or more locations.

In this example, the system 100 includes two additional servers 112a-112b. The servers 112a-112b execute various applications to control the overall operation of the system 100. For example, the system 100 could be used in a processing or production plant or other facility, and the servers 112a-112b could execute applications used to control the plant or other facility. As particular examples, the servers 112a-112b could execute applications such as enterprise resource planning (ERP), manufacturing execution system (MES), or any other or additional plant or process control applications. Each of the servers 112a-112b includes any hardware, software, firmware, or combination thereof for controlling the overall operation of the system 100.

As shown in FIG. 1, the system 100 includes various redundant networks 114a-114b and single networks 116a-116b that support communication between components in the system 100. Each of these networks 114a-114b, 116a-116 b represents any suitable network or combination of networks facilitating communication between components in the system 100. The networks 114a-114b, 116a-116b could, for example, represent Ethernet networks. In some embodiments, the networks 114a-114b, 116a-116b may be categorized into different categories of networks. For example, a "supervisory" network could represent a network that couples servers and clients (such as servers 106a-106b and operator stations 108a-108b) and that does not have any direct connection to the controllers 104a-104b. As another example, an "auxiliary" network could represent a network that provides direct access to the controllers 104a-104b. In particular embodiments, an auxiliary network may be localized to a server and provide direct access to the controllers 104a-104b, and different auxiliary networks may be unable to communicate directly with one another. As yet another example, an EXPERION PROCESS NETWORK (EPN) by HONEYWELL INTERNATIONAL INC. could represent a network that provides peer-to-peer communications between the controllers 104a-104b and other devices. Those skilled in the art will recognize that a process control system 100 could have any suitable network topology according to particular needs.

In one aspect of operation, a software program may be installed on one or more components of the system 100 (such as the servers 106a-106b or the operator stations 108a-108c). The software program may, for example, implement logic used to control or monitor the controllers 104a-104b or other logic used in the system 100. Installation of the software program may represent a complex process, and a user may be required to enter various information or otherwise participate in the installation process. This may require the user to obtain help information that assists the user during the software installation process.

One or more components in the system 100 provide context sensitive help information to the user during the software installation process. The help information is said to be "context sensitive" because the help information presented to the user is based on the current software installation being performed. Among other things, this means that the help information presented to the user may take into account the various options and selections the user has previously made during the installation process. For example, the help information presented to the user could be based on the type of device (such as controller, server, or operator station) on which the software program is being installed. As another example, the help information presented to the user could be based on the configuration of the process control system 100 as identified by the user during the installation process. As a particular example, the help information presented to the user could be based on the types of auxiliary and supervisory networks (as identified by the user during the installation process) that are coupled to the device on which the software program is being installed. The help information could be based on any other or additional characteristics of a software installation.

By providing context sensitive help information to a user in this way, the user may be able to obtain more relevant help information during the installation process. For example, the help information provided to the user may be based on the user's prior selections (such as the type of network or device) and the current information being requested during the installation process. Rather than receiving generic help information, the help information provided to the user in this manner may be customized and therefore more useful to the user. Moreover, the user may obtain the help information more quickly and easily since the user is not required to access a written manual and locate the relevant help information.

In some embodiments, context sensitive help information is provided to a user by displaying Hypertext Markup Language (HTML) pages to the user via an operator station 108a-108c. The HTML pages (containing different help information) are then associated with different index values. In particular embodiments, the index values represent map identifiers (referred to as "MapIDs") associated with different HTML pages. An index value is then initialized and associated with a particular installation of a software program. As different configuration information or other information affecting the software installation is provided by the user, the index value associated with the software installation is updated. More specifically, the index value associated with the software installation is adjusted so that the index value points to help information that is specific to the current software installation. At any particular point in time during the installation process, the index value may be used to identify the appropriate HTML page, which contains context specific help information that is displayed to the user.

The help information presented to a user may be stored in any suitable manner within the process control system 100. For example, the help information could be stored on an optical storage medium (such as a CD or DVD) that is inserted into an optical drive in or coupled to an operator station 108a-108c. The optical storage medium could, for example, contain the software program to be installed in the process control system 100 and the help information associated with that software program. As a particular example, the optical storage medium could include a compiled HTML help file (denoted with a ".CHM" suffix) that contains (i) HTML pages having the context specific help information and (ii) a table of contents or other mapping that associates MapIDs or other index values with the HTML pages. The help information could be stored or accessed in any other suitable manner, such as by downloading the help information onto an operator station 108a-108c.

Although FIG. 1 illustrates one example of a process control system 100, various changes may be made to FIG. 1. For example, a control system could include any number of process elements, controllers, servers, and operator stations. Also, FIG. 1 illustrates one operational environment in which context sensitive help information could be used during a software installation. The context sensitive help information could be used in any other suitable process control or non-process control device or system. In addition, although routinely described in this document as being used during a software installation process, context sensitive help information could be provided to a user during any other suitable process or task.

Figure 2:
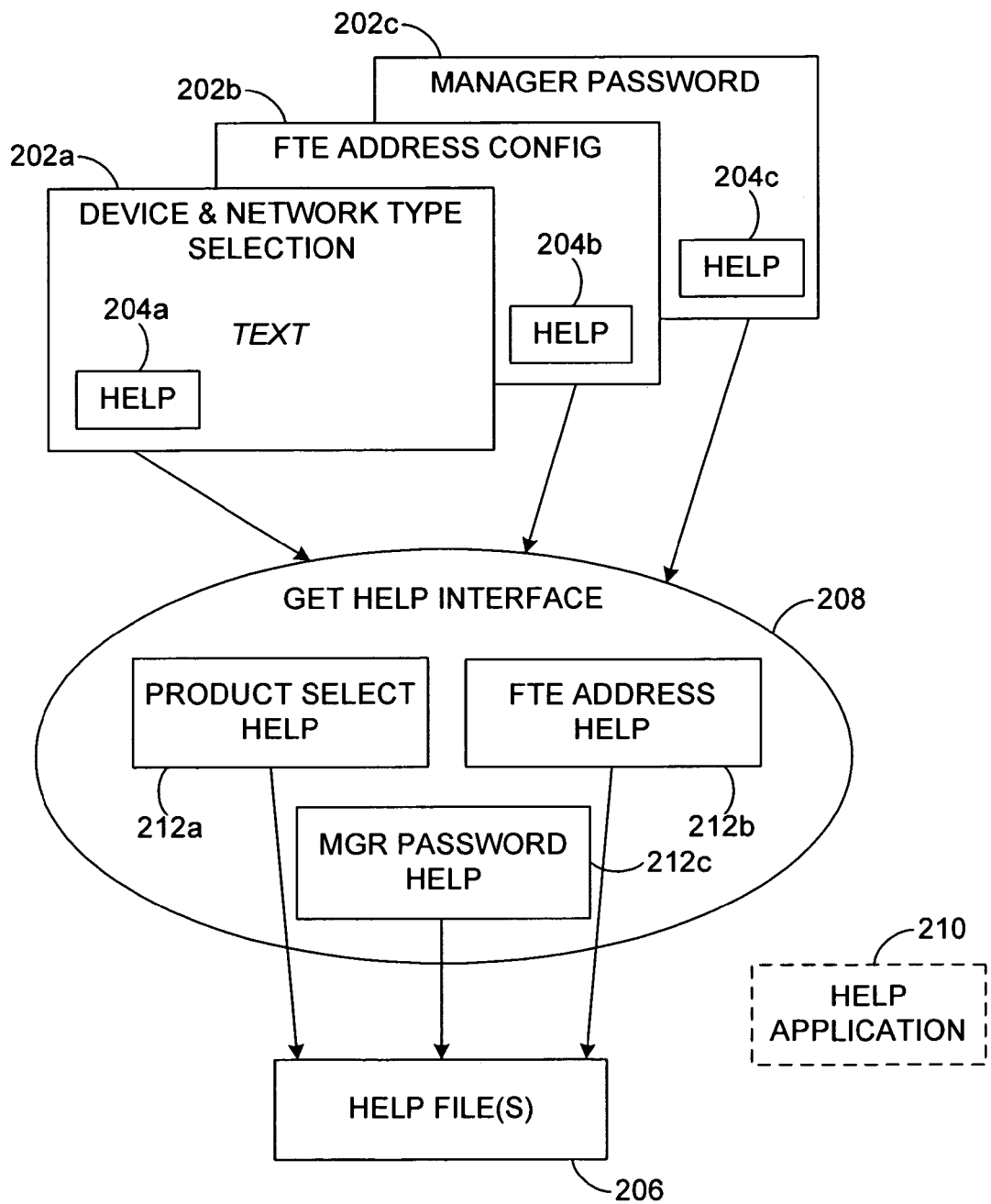
FIG. 2 illustrates an example system for providing context sensitive help information according to one embodiment of this disclosure.

FIG. 2 illustrates an example system 200 for providing context sensitive help information according to one embodiment of this disclosure. The embodiment of the system 200 shown in FIG. 2 is for illustration only. Other embodiments of the system 200 may be used without departing from the scope of this disclosure. Also, for ease of explanation, the system 200 is described as being implemented on or used by an operator station 108a-108c in the process control system 100 of FIG. 1. The system 200 could be used by any other suitable device and in any other suitable system.

In this example, an operator station 108a-108c presents various installation displays 202a-202c to a user during installation of a software program. The installation displays 202a-202c are associated with different operations or aspects of the software installation. As shown in FIG. 2, the installation displays 202a-202c display text to the user describing the various operations or aspects of the software installation. The text may be used to collect information from the user that is needed during the software installation. For example, the installation display 202a presents text associated with and collects information identifying the type of device on which the software program is being installed. The installation display 202a also presents text associated with and collects information identifying the type(s) of network(s) coupled to the identified device. The information could be collected in any suitable manner, such as by providing a list of options for selection by the user. The installation display 202b presents text associated with and collects information identifying the network address of the identified device in a FAULT TOLERANT ETHERNET (FTE) network from HONEYWELL INTERNATIONAL INC. The installation display 202c presents text associated with and collects information identifying a password for the identified device. Any other or additional displays could be presented to the user during the software installation process, and any other or additional information may be collected from the user during the software installation process. The installation displays 202a-202c represent any suitable mechanism for presenting information to or collecting information from a user, such as dialog boxes.

As shown in FIG. 2, the installation displays 202a-202c contain help buttons 204a-204c, respectively. The help buttons 204a-204c may be selected by the user during the software installation process. Selection of a help button causes the system 200 to present context sensitive help information from one or more help files 206 to the user. In some embodiments, help information is divided into sections or topics in the help files 206, and bookmarks (such as MapIDs) identify different ones of the sections or topics. As described in more detail below, each of the help buttons 204a-204c could cause a current MapID value to be used as an index into the help files 206 to obtain context specific help information.

The help files 206 contain help information that can be accessed and provided to a user. The help files 206 could contain the help information in any suitable format or arrangement. For example, the help files 206 could contain text that is divided into sections or topics, where the sections or topics are delineated by bookmarks. As a particular example, the help files 206 could represent one or more compiled HTML help files (.CHM files). Also, a user may be able to navigate a single help file 206 or between multiple help files 206, such as when one HTML page in a help file 206 contains links to other pages within that help file 206 or in other help files 206.

A get help interface 208 provides an interface to or mechanism for accessing the context sensitive help information in the help files 206. For example, the interface 208 could cause another application 210 to launch and provide help information from the help files 206 to a user. As a particular example, the interface 208 could launch a help system application 210 provided by a MICROSOFT WINDOWS operating system, and the interface 208 could provide the help system application 210 with a name (full path name or local name) of a help file 206 to be accessed and a bookmark into that help file 206. The help system application 210 could then access the identified help file 206 using the bookmark and provide the appropriate help information to the user. In particular embodiments, the help system application 210 may remain active even if the get help interface 208 is later closed or terminated. In other embodiments, the interface 208 itself could access the help files 206 and provide the bookmarked help information to the user. The interface 208 includes any hardware, software, firmware, or combination thereof for facilitating access to context sensitive help information, whether directly or indirectly through another component.

In particular embodiments, the interface 208 may operate in one of multiple modes. For example, in a test mode, the interface 208 displays a window containing one or more buttons 212a-212c. The buttons 212a-212c may be associated with particular MapID values or other bookmarks into the help files 206. A user may depress the buttons 212a-212c to access the help information in the help files 206. This functionality may be useful, for example, when programmers or developers are validating the help files 206 by ensuring that the proper information is displayed. The test mode could be initiated in any suitable manner, such as by launching the interface 208 without any arguments (without the name of a help file 206 and a bookmark). In another mode of operation, the interface 208 could be launched and could initiate the display of help information to a user without any visible indication that the interface 208 is running. This mode may be useful, for example, when end users are attempting to install the software program.

The interface 208 could also be launched or invoked by multiple applications. For example, a first application could call the interface 208 and identify a first help file 206 and a first bookmark. A second application could also call the interface 208 and identify a second help file 206 and a second bookmark. This causes different help information to be displayed. If a subsequent call to the interface 208 is made that identifies a help file 206, the interface 208 determines whether the identified help file 206 is already open. If the identified help file 206 is open, the interface 208 may replace the previously displayed help information from that help file 206 with new help information from the same help file 206 (without needing to open the help file 206 again).

In some embodiments, the interface 208 and the help files 206 are copied onto a user's device (such as an operator station 108a-108c) during installation of a software program. This may occur, for example, when the interface 208, the help files 206, and the software program are contained on an optical storage medium provided to the operator station 108a-108c. Also, the interface 208 and the help files 206 may be copied onto the user's device prior to the user's first opportunity to request help information. The user may or may not be given the opportunity to specify where the interface 208 and/or the help files 206 are installed. If given the option, the user could specify a local location or a remote location, such as a remote server (assuming a connection with the remote location can be re-established after a reboot during the software installation). In particular embodiments, a version of the help files 206 could already be installed on the user's device when the software installation is initiated. In these embodiments, the help files 206 already on the user's device may be overwritten unless they have a later timestamp than the help files 206 on the optical storage medium. Also, if updates to the software program are released, the updates may include updated help files 206 that are copied onto the user's device and overwrite any prior versions of the help files 206.

Although FIG. 2 illustrates one example of a system 200 for providing context sensitive help information, various changes may be made to FIG. 2. For example, FIG. 2 illustrates the use of a single help button in each of the installation displays 202a-202c. In these embodiments, each help button may initiate presentation of help information for the entire installation display. In other embodiments, an installation display could include multiple buttons associated with different topics. Also, FIG. 2 illustrates three possible operations or aspects (device and network type selection, FTE address configuration, and manager password selection) for which help information can be obtained. Help information could be provided or obtained for any other or additional operations or aspects, such as the designation of a customer or company name, definition of a user password, designation of software licensing information, and selection of optional software components.

Figure 3:
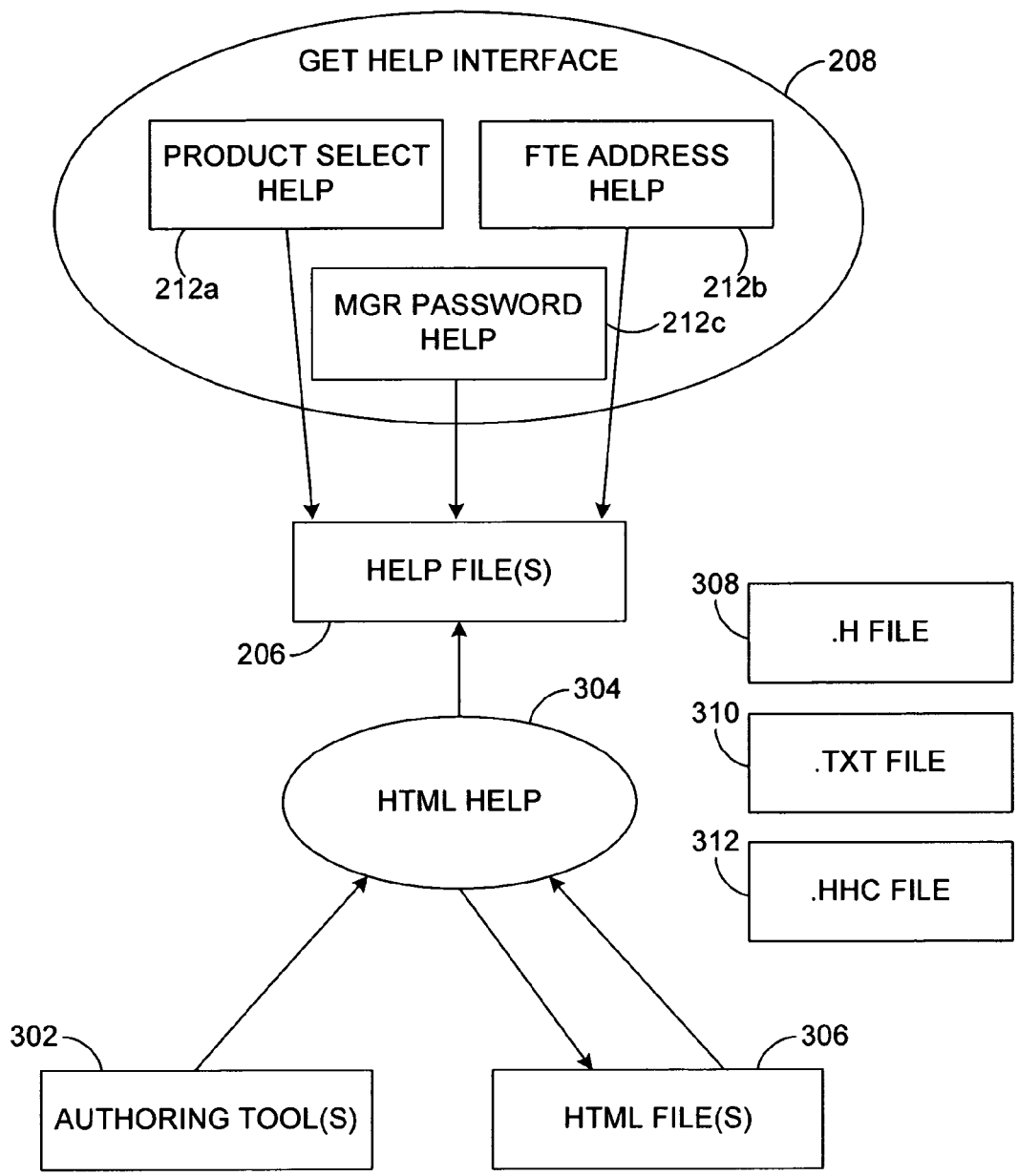
FIG. 3 illustrates an example system for generating context sensitive help information according to one embodiment of this disclosure.

FIG. 3 illustrates an example system 300 for generating context sensitive help information according to one embodiment of this disclosure. The embodiment of the system 300 shown in FIG. 3 is for illustration only. Other embodiments of the system 300 may be used without departing from the scope of this disclosure. Also, for ease of explanation, the system 300 is described as being implemented on or used by an operator station 108a-108c in the process control system 100 of FIG. 1. The system 300 could be used by any other suitable device and in any other suitable system.

In this example, the system 300 includes one or more authoring tools 302. The authoring tools 302 represent one or more applications that can be used to create documents containing help information. For example, the authoring tools 302 could include WORD by MICROSOFT CORPORATION or FRAMEMAKER by ABODE SYSTEMS INC. As a particular example, the authoring tools 302 could be used to generate a Software Installation and Upgrade Guide (SIUG), which generally represents a document containing all of the help information needed to install or upgrade a software program.

One or more documents containing the help information are provided to an HTML help application 304. The HTML help application 304 converts the documents generated using the authoring tools 302 into one or more HTML files 306. The HTML help application 304 also compiles the HTML files 306 to generate one or more compiled HTML help files (such as help files 206). The HTML help application 304 represents any suitable hardware, software, firmware, or combination thereof for generating compiled help files. The HTML help application 304 could, for example, represent HTML HELP from MICROSOFT CORPORATION or ROBOHELP from MACROMEDIA, INC.

As noted above, MapIDs could be associated with particular HTML pages in the HTML files 306. In these embodiments, a file 308 (such as a .h file) may associate the MapIDs and the HTML pages, thereby linking the MapIDs to the associated HTML pages. The HTML files 306 are also linked to particular section or topic names in another file 310 (such as a .txt file). A file 312 (such as a .hhc file) defines objects associating the HTML files 306 and the section or topic names, thereby creating a table of contents for the help information. Using the files 308-312, the HTML help application 304 places the help information contained in the HTML files 306 into a readable and structured format (the .CHM files).

Once the help files 206 are created in this manner, the get help interface 208 may be launched in test mode to test the newly created help files 206. For example, the interface 208 could open a window and display the buttons 212a-212c, which are associated with different bookmarks into the help files 206. A user may then select the buttons 212a-212c to verify that the help files 206 are formatted and structured properly.

Although FIG. 3 illustrates one example of a system 300 for generating context sensitive help information, various changes may be made to FIG. 3. For example, FIG. 3 illustrates one possible mechanism for generating help files for use in providing context sensitive help information to a user. Any other suitable mechanism could also be used to generate the context sensitive help information. As a particular example, any suitable third-party or other tool can be used to support the generation or authoring of .CHM files, such as tools supporting assignable or importable MapIDs, topics, and organizational files.

FIG. 4 illustrates an example table 400 representing the use of context sensitive help information according to one embodiment of this disclosure. In particular, FIG. 4 illustrates how a MapID value may be adjusted during a software installation in order to provide context sensitive help information to a user. The table 400 (and the functionality it represents) shown in FIG. 4 is for illustration only. Other tables and associated functionalities could be used, whether in the process control system 100 of FIG. 1 or in any other suitable system.

In this example, the table 400 is divided into three columns 402-406, plus one or more additional columns 408. The first column 402 of the table 400 represents the initialization of a MapID value based on where a software program is being installed. For example, the software program could be installed on a server (such as a server 106a or 106b), a flex station (such as an operator station 108a or 108b), or a console station (such as an operator station 108c). The values 410 in parentheses within the entries in the column 402 represent the initial MapID value. As shown in FIG. 4, if a software program is being installed on a server, the MapID value is initialized to "9." If the software program is being installed on a flex station, the MapID value is initialized to "10." If the software program is being installed on a console station, the MapID value is initialized to "11." In other embodiments, the MapID value could be initialized (such as to a value of "0") and a particular value 410 could be added to the MapID value. The determination as to where the software program is being installed (the type of device) can be made in any suitable manner, such as automatically or based on information from the user.

After that, the current MapID value is updated based on the type of auxiliary network and/or supervisory network coupled to the device on which the software program is being installed. This updating is represented in the second and third columns 404-406 of the table 400. In column 404, a component could be coupled to both an auxiliary network and a supervisory network. In column 406, a component could be coupled to only a supervisory network. For the server 106a or 106b or a console station (operator station 108c) in FIG. 1, an auxiliary network could couple the server or console station to one or more controllers 104a-104b, while a supervisory network could couple the server or console station to a higher-level component (such as a server 112a or 112b). For a flex station (operator station 108a or 108b), the supervisory network could couple the flex station to one or more servers (such as servers 106a-106b).

As shown in FIG. 4, different types of auxiliary and/or supervisory networks could be coupled to the device on which a software program is being installed. For example, an auxiliary network could be formed from an RSLinx network, an Ethernet network, a Local Control Network (LCN), or another type of network. Also, a supervisory network could be formed from an Ethernet network or an FTE network.

As shown in a row 412 of the table 400, each type of auxiliary or supervisory network is associated with a different incremental value. For example, an Ethernet auxiliary network is associated with an incremental value of "3,000," while an Ethernet supervisory network is associated with an incremental value of "30,000." The user may be provided a list of options identifying the types of auxiliary or supervisory networks available for selection. Depending on the specific type of auxiliary network or supervisory network selected by the user, one or more incremental values may be added to the current MapID.

Various entries in the table 400 are associated with different MapID values 414 (shown in the upper left corners of the entries in FIG. 4). These different MapID values are associated with different HTML pages containing help information. Also, the values 416 in parentheses illustrate updated values for the current MapID value, depending on the specific information provided by the user during a software installation. By adding appropriate values (shown in the row 412) based on a particular software installation to the current MapID value, the current MapID value represents the specific options or configuration of the particular software installation. In other words, the current MapID value can be used to reflect the prior selections and choices made by a user during the installation process. As a result, the MapID value can be used as an index into the help files 206 to obtain help information tailored or specific to the particular installation process being performed. The determination as to the type(s) of network coupled to a device can be made in any suitable manner, such as automatically or based on information from the user.

As an example, if the user is installing software on a server, the MapID value is initially set to a value of "9." If the user requests help at this point, an HTML page associated with this MapID value can be retrieved and presented to the user, where the HTML page contains help information specifically for a server. If the user then indicates that the server is coupled to an LCN auxiliary network and an FTE supervisory network, the MapID value is updated by adding incremental values of "6,000" and "40,000." This results in a current MapID value of "46,009." If the user requests help at this point, an HTML page associated with this MapID value can be retrieved and presented to the user. The information in this HTML page may contain help information specifically for a server that is coupled to an LCN auxiliary network and an FTE supervisory network.

As another example, if the user is installing software on a console station, the MapID value is initially set to a value of "11." If the user requests help at this point, an HTML page associated with that MapID value and containing help information specifically for a console station can be retrieved and presented to the user. If the user indicates that the console station is coupled to an Ethernet supervisory network and an Ethernet auxiliary network, the MapID value is updated by adding incremental values of "30,000" and "3,000." This results in a MapID value of "33,011." If the user requests help at this point, an HTML page associated with this MapID value can be retrieved and presented to the user, where the HTML page contains help information specifically for a console station coupled to Ethernet auxiliary and supervisory networks.

In particular embodiments, every combination of selections by a user results in a unique MapID value or other index value. In these embodiments, different combinations of selections by the user may never result in the same MapID value. By adjusting the MapID value in this way, the MapID value can be used to identify help information that is specific to the exact combination of selections made by the user during the installation process.

Although FIG. 4 illustrates one example of a table 400 representing the use of context sensitive help information, various changes may be made to FIG. 4. For example, the table 400 shown in FIG. 4 may or may not be used to actually provide context sensitive help information to a user. Depending on the implementation, the functionality represented by the table 400 could be incorporated into a program or otherwise made available to the user without requiring the use of the table 400.

Figure 5:
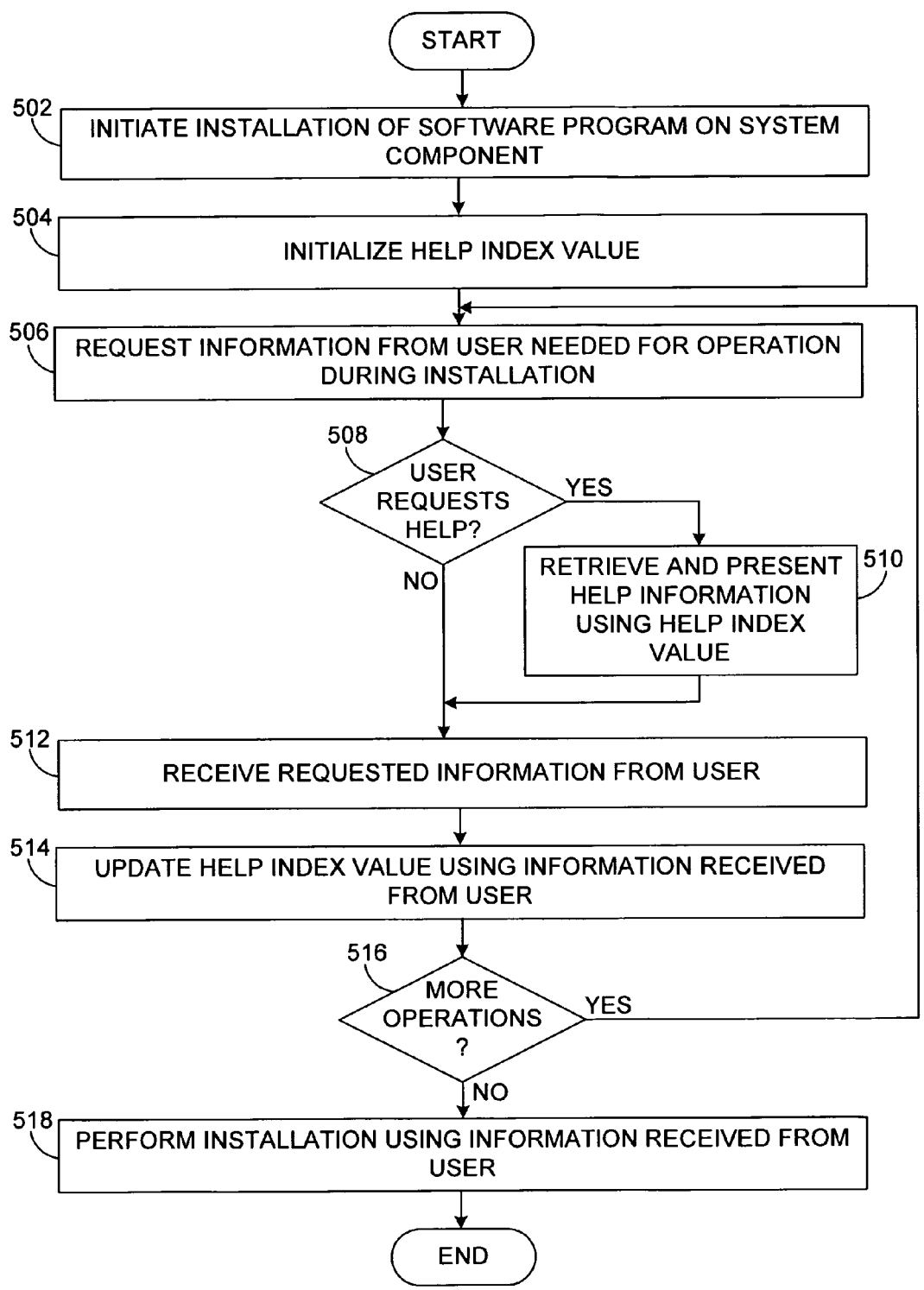
FIG. 5 illustrates an example method for providing context sensitive help information according to one embodiment of this disclosure.

FIG. 5 illustrates an example method 500 for providing context sensitive help information according to one embodiment of this disclosure. For ease of explanation, the method 500 is described with respect to the system 200 of FIG. 2 operating in the process control system 100 of FIG. 1. The method 500 could be used by any suitable device and in any suitable system.

A user initiates installation of a software program on a component of the process control system 100 at step 502. This may include, for example, the user initiating installation of the software program on a server 106a-106b or an operator station 108a-108c. As a particular example, this may include the user inserting an optical storage medium in an optical drive of the server or operator station and initiating installation of a software program stored on that medium.

A help index value is initialized at step 504. This may include, for example, the server or operator station setting a MapID value equal to zero or some other initial value. As a particular example, this may include the server or operator station setting the MapID value to a non-zero value based on the type of device on which the software program is being installed.

Information from the user is requested for an operation of the installation process at step 506. This may include, for example, the server or operator station using a display to prompt the user to identify the type of auxiliary or supervisory network coupled to the device on which the software program is being installed. This may also include the server or operator station using displays to prompt the user to identify the network address of the device and to identify a password for the device.

The server or operator station determines if the user requests help at step 508. This may include, for example, the server or operator station determining if the user has selected a help button in the display presented to the user.

If help is requested, the server or operator station retrieves context sensitive help information using the current help index value and displays the retrieved help information to the user at step 510. This may include, for example, the server or operator station launching the get help interface 208 with the name of a help file 206 and the current MapID value. The name of the help file 206 may be associated with the help button selected by the user. This may also include the interface 208 or the application 210 retrieving an HTML page from the identified help file 206 using the current MapID value. This may further include displaying the retrieved HTML page to the user. Because the displayed HTML page is retrieved using the current MapID value and the current MapID value takes into account the prior selections made by the user, the retrieved HTML page may be specific to the current installation of the software program.

The information requested from the user is received from the user at step 512. This may include, for example, the server or operator station receiving information identifying the type of auxiliary or supervisory network coupled to the device on which the software program is being installed. This may also include the server or operator station receiving information identifying the network address of the device or a password for the device.

The help index value is updated using the information received from the user at step 514. This may include, for example, the server or operator station updating the MapID value with one or more incremental values. The particular incremental value or values added to the MapID value may vary depending on the type of auxiliary network or supervisory network coupled to the device on which the software program is being installed.

If information for at least one operation remains to be collected at step 516, the method 500 returns to step 506 to retrieve information from the user for that operation. Otherwise, all of the necessary information has been collected, and the software installation is performed using the collected information at step 518. This may include, for example, the server or operator station installing the necessary software components to enable the device to communicate over the identified type auxiliary or supervisory network. This may also include the server or operator station performing the necessary steps to define the network address of the device in an FTE network. This may further include the server or operator station establishing a password for the device.

Although FIG. 5 illustrates one example of a method 500 for providing context sensitive help information, various changes may be made to FIG. 5. For example, the initialization of the help index value at step 504 could be based on information provided by the user, so step 506 could occur before the step 504. Also, not every operation of the installation process may involve collecting information from the user, offering the user the opportunity to request help, or using information from the user to perform the operation. In addition, context sensitive help information could be provided to a user during any suitable process or task (and is not limited to use during a software installation process).

In some embodiments, the various functions performed in conjunction with the presentation of context sensitive help information are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The term "application" refers to one or more computer programs, sets of instructions, procedures, functions, objects, classes, instances, or related data adapted for implementation in a suitable computer language. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method, comprising:
   receiving information identifying a plurality of selections made by a user;
   updating a help index value based on the selections;
   detecting a request for help from the user;
   retrieving help information from a memory using the help index value, wherein the help index value identifies the retrieved help information; and
   presenting the retrieved help information to the user on a display;
   wherein updating the help index value comprises, in response to each of two or more of the selections, combining a prior value of the help index value with a new value associated with that selection such that the help index value identifies at least partially different help information after each of the two or more selections; and
   wherein each unique combination of the two or more selections results in a unique updated help index value such that at least a portion of the retrieved help information is specifically associated with the combination of two or more selections made by the user.

2. The method of claim 1, wherein:
   at least one of the selections by the user comprises a selection of an option from a plurality of options;
   each of the options is associated with a different incremental value; and
   updating the help index value comprises adding the incremental value associated with the selected option to the help index value.

3. The method of claim 2, wherein:
   the plurality of selections comprises one or more of: (i) a selection of a type of device, and (ii) a selection of at least one type of network coupled to the device;
   the help index value is initialized or updated based on the selected type of device; and
   the help index value is updated based on the at least one selected type of network coupled to the device.

4. The method of claim 1, wherein:
   the help information is divided into a plurality of sections or topics in one or more help files; and
   each section or topic in one help file is associated with a different bookmark.

5. The method of claim 4, wherein the help index value identifies the bookmark associated with one of the sections or topics in one of the one or more help files.

6. The method of claim 5, wherein retrieving the help information comprises:
   receiving a name of a particular help file and the help index value; and
   accessing the named help file using the bookmark identified by the help index value.

7. The method of claim 6, wherein accessing the named help file comprises one of:
   accessing the named help file directly; and
   launching an application configured to access the named help file.

8. The method of claim 1, wherein:
   the help information is divided into Hypertext Markup Language (HTML) pages;
   each HTML page is associated with a unique map identifier; and
   the help index value represents one of the map identifiers.

9. The method of claim 1, wherein detecting the request for help from the user comprises detecting the user selecting a help button in a display presented to the user.

10. The method of claim 1, wherein:
    the plurality of selections made by the user are associated with a software installation; and
    the retrieved help information comprises information associated with the software installation.

11. An apparatus, comprising:
    at least one memory configured to store help information; and
    at least one processor configured to:
       receive information identifying a plurality of selections made by a user;
       update a help index value based on the selections;
       detect a request for help from the user;
       retrieve a portion of the help information using the help index value, wherein the help index value identifies the retrieved help information; and
       present the retrieved portion of the help information to the user;
    wherein the at least one processor is configured to update the help index value by, in response to each of two or more of the selections, combining a prior value of the help index value with a new value associated with that selection such that the help index value identifies at least partially different help information after each of the two or more selections; and
    wherein each unique combination of the two or more selections results in a unique updated help index value such that at least a portion of the retrieved help information is specifically associated with the combination of two or more selections made by the user.

12. The apparatus of claim 11, wherein:
    at least one of the selections by the user comprises a selection of an option from a plurality of options;
    each of the options is associated with a different incremental value; and
    the at least one processor is configured to update the help index value by adding the incremental value associated with the selected option to the help index value.

13. The apparatus of claim 12, wherein:
    the plurality of selections comprises: (i) a selection of a type of device, and (ii) a selection of at least one type of network coupled to the device;
    the help index value is initialized or updated based on the selected type of device; and
    the help index value is updated based on the at least one selected type of network coupled to the device.

14. The apparatus of claim 11, wherein:
    the help information is divided into a plurality of sections or topics in one or more help files;
    each section or topic in one help file is associated with a different bookmark; and the help index value identifies the bookmark associated with one of the sections or topics in one of the one or more help files.

15. The apparatus of claim 14, wherein the at least one processor is configured to retrieve the portion of the help information by:
receiving a name of a particular help file and the help index value; and
accessing the named help file using the bookmark identified by the help index value.

16. The apparatus of claim 11, wherein:
the help information is divided into Hypertext Markup Language (HTML) pages;
each HTML page is associated with a unique map identifier; and
the help index value represents one of the map identifiers.

17. A computer readable medium embodying a computer program stored thereon, the computer program comprising:
computer readable program code for receiving information identifying a plurality of selections made by a user;
computer readable program code for updating a help index value based on the selections;
computer readable program code for detecting a request for help from the user;
computer readable program code for retrieving help information using the help index value, wherein the help index value identifies the retrieved help information; and
computer readable program code for presenting the retrieved help information to the user;
wherein the computer readable program code for updating the help index value comprises computer readable program code for combining, in response to each of two or more of the selections, a prior value of the help index value with a new value associated with that selection such that the help index value identifies at least partially different help information after each of the two or more selections; and
wherein each unique combination of the two or more selections results in a unique updated help index value such that at least a portion of the retrieved help information is specifically associated with the combination of two or more selections made by the user.

18. The computer readable medium of claim 17, wherein:
at least one of the selections by the user comprises a selection of an option from a plurality of options;
each of the options is associated with a different incremental value; and
the computer readable program code for updating the help index value comprises computer readable program code for adding the incremental value associated with the selected option to the help index value.

19. The computer readable medium of claim 18, wherein:
the plurality of selections comprises: (i) a selection of a type of device, and (ii) a selection of at least one type of network coupled to the device;
the help index value is initialized or updated based on the selected type of device; and
the help index value is updated based on the at least one selected type of network coupled to the device.

20. The computer readable medium of claim 17, wherein:
the help information is divided into a plurality of sections or topics in one or more help files;
each section or topic in one help file is associated with a different bookmark; and
the help index value identifies the bookmark associated with one of the sections or topics in one of the one or more help files.

21. The method of claim 1, wherein:
updating the help index value comprises adding two or more numbers to the prior value of the help index value, the numbers based on the two or more selections.

* * * * *